(12) United States Patent
Coplestone

(10) Patent No.: US 12,110,994 B2
(45) Date of Patent: Oct. 8, 2024

(54) CONNECTOR ASSEMBLY

(71) Applicant: Poulton Technologies Limited, Bristol (GB)

(72) Inventor: Rodney Coplestone, Marlborough (GB)

(73) Assignee: POULTON TECHNOLOGIES LIMITED, Bristol (GB)

( * ) Notice: Subject to any disclaimer, the term of this patent is extended or adjusted under 35 U.S.C. 154(b) by 56 days.

(21) Appl. No.: 17/913,851

(22) PCT Filed: Mar. 23, 2021

(86) PCT No.: PCT/GB2021/050709
§ 371 (c)(1),
(2) Date: Sep. 23, 2022

(87) PCT Pub. No.: WO2021/191599
PCT Pub. Date: Sep. 30, 2021

(65) Prior Publication Data
US 2023/0349493 A1    Nov. 2, 2023

(30) Foreign Application Priority Data
Mar. 23, 2020 (GB) .................................... 2004202

(51) Int. Cl.
*F16L 19/065* (2006.01)
*F16L 19/075* (2006.01)

(52) U.S. Cl.
CPC ........... *F16L 19/065* (2013.01); *F16L 19/075* (2013.01)

(58) Field of Classification Search
CPC ..... F16L 19/065; F16L 19/075; F16L 21/065; F16L 21/06; F16L 21/045
See application file for complete search history.

(56) References Cited

U.S. PATENT DOCUMENTS 2,108,848 A * 2/1938 Engel
2,790,655 A * 4/1957 Frederick .............. F16L 21/045
3,116,546 A * 1/1964 Newell .................. F16L 21/04
(Continued)

FOREIGN PATENT DOCUMENTS

DE    20 2006 006 399 U1    7/2006
WO    WO 2015/036757        3/2015

OTHER PUBLICATIONS

International Search Report dated Jul. 7, 2021 issued in PCT International Patent Application No. PCT/GB2021/050709, 2 pp.

*Primary Examiner* — William S. Choi
(74) *Attorney, Agent, or Firm* — NIXON & VANDERHYE P.C.

(57) ABSTRACT

A connector assembly has a connector body for housing a free end of a pipe. A seal within the body includes a metal annular seal surface for arrangement about the pipe and a metal annular seal element for fitting about the pipe. The annular seal element creates a first annular sealing contact for creating a metal-to-metal seal with a metal outer surface of a pipe and a second annular sealing contact for creating a metal-to-metal seal with the annular seal surface. An annular loading ring is configured for fitting about the pipe and is configured to be arranged for communication between the body and the pipe. The annular loading ring includes one or more channels or bores extending from an external surface for use in the application of energising load to the annular seal element within the body.

26 Claims, 4 Drawing Sheets

(56) References Cited

U.S. PATENT DOCUMENTS

| | | |
|---|---|---|
| 3,712,644 A | 1/1973 | Hara et al. |
| 3,884,509 A * | 5/1975 | Marsh, Jr. |
| 5,208,569 A | 5/1993 | Michelangelo et al. |
| 7,722,092 B2 * | 5/2010 | Kim ........................ F16L 21/06 |
| 2019/0234543 A1* | 8/2019 | Coplestone ........... F16L 19/075 |

* cited by examiner

CONNECTOR ASSEMBLY

FIELD OF THE INVENTION

The present invention relates to a connector assembly, more particularly, but not exclusively, to a connector assembly for a pipe.

BACKGROUND OF THE INVENTION

There is an ongoing requirement within the oil industry to provide cost-efficient and consistent methods of connecting oil pipes together in a way that minimises the risk of oil leakage.

Typically, flanged joints are used. These have a number of disadvantages. For example, flanged joints are vulnerable and can be compromised by uneven bolt tightening. Moreover, rubber seals are generally used within these joints, and often fail due to thermal degradation, as well as being at significant risk of damage and subsequent failure from bad practice when joints are assembled on site.

Flanged joints also require welding. This is time consuming during assembly, increasing down time for pipe repairs as well as presenting a fire risk. Further, amidst recent proposals for better offshore pipeline regulation and more refined safety rules covering repairs, there is a requirement to employ qualified welders to perform any repairs, which is a considerable added expense. The installation of flange joints also requires very high precision, requiring highly skilled labour for assembly, further increasing the cost of installation, repair and maintenance.

The present invention seeks to overcome or at least mitigate/alleviate one or more problems associated with the prior art.

SUMMARY OF THE INVENTION

A first aspect of the invention provides a connector assembly for a pipe, the connector assembly comprising:
- a connector body for housing a length of a pipe to be connected;
- a mechanical seal arrangement within the connector body, the mechanical seal arrangement comprising an annular seal surface configured for arrangement about the pipe to be connected, the mechanical seal arrangement further comprising an annular seal element configured for fitting about a pipe to be connected, wherein the annular seal element is configured for creating a first annular sealing contact with a pipe to be connected and a second annular sealing contact with the annular seal surface;
- further wherein the connector assembly comprises an annular loading ring configured for fitting about a pipe to be connected, wherein the annular loading ring is configured to be within the connector body and arranged between the connector body and the pipe to be connected in use, and wherein the annular loading ring comprises one or more channels or bores extending from an external surface of the annular loading ring to an internal surface of the annular loading ring, for use in the application of energising load to the annular seal element within the connector body;
- further wherein the connector assembly includes a mechanical engagement arrangement for preventing axial movement of the connector body relative to the pipe to be connected in use, and wherein the annular loading ring is configured to be coupled with the connector body, for preventing relative axial movement between the annular loading ring and the connector body in use.

In exemplary embodiments, each channel or bore comprises an internal thread such that a bolt or rod with a corresponding external thread can be rotated therein, to advance into the connector body and provide an energising load to said annular seal element.

In exemplary embodiments, each channel or bore extends in an axial direction of the connector body.

In exemplary embodiments, the annular seal element is metallic and wherein the annular seal surface is metallic, for creating a metal-to-metal seal at said second annular sealing contact.

In exemplary embodiments, the annular loading ring has a radially internal surface configured to be adjacent a pipe to be connected, in use.

In exemplary embodiments, the radially internal surface has a profile configured for preventing relative movement between the annular loading ring and the pipe; optionally, wherein the radially internal surface defines one or more projections for engagement with a complementary formation in the external surface of a pipe to be connected, for preventing relative movement between the annular loading ring and the pipe.

In exemplary embodiments, the annular loading ring and connector body comprise complementary formations configured to key the annular loading ring to the connector body; optionally, wherein the annular loading ring defines a projection and the connector body defines a complementary recess for receiving said projection of the annular loading ring, for keying the annular loading ring to the connector body; optionally, wherein said projection of the annular loading ring extends in a radially outward direction.

In exemplary embodiments, the connector assembly further comprises a sleeve member configured to extend within the connector body, and wherein the annular seal surface is provided on the sleeve member; optionally, wherein the annular seal surface is configured to extend at an angle to the longitudinal axis of the connector body in use.

In exemplary embodiments, the sleeve member is configured to be coupled with the connector body, to prevent relative movement between the sleeve member and the connector body In exemplary embodiments, the sleeve member and connector body comprise complementary formations configured to key the sleeve member to the connector body; optionally, wherein the connector body comprises an internal surface having one or more projections, and wherein the sleeve member comprises an external surface having a corresponding number of complementary recesses for receiving said at least one projection of the connector body, for keying the sleeve member to the connector body; optionally, wherein said more or more projections of the connector body extends in a radially inward direction; optionally, wherein said internal surface of the connector body extends in an axial direction of the connector body in use; optionally, wherein said external surface of the sleeve member extends in an axial direction of the connector body in use.

In exemplary embodiments, the connector body comprises first and second parts configured to be secured together to at least substantially surround the annular seal element and annular seal surface in use.

In exemplary embodiments, said first and second parts have an inner wall which defines an arcuate internal profile, and wherein the annular seal element has a radially outer wall of complementary arcuate external profile for nesting within the arcuate internal profile of the said first and second parts.

In exemplary embodiments, the first and second parts define a semi-circular internal profile In exemplary embodiments, the first and second parts define a substantially semi-circular internal profile (e.g. having an internal angle which is less than 180 degrees but greater than 150 degrees; optionally, less than 178 degrees and greater than 165 degrees), so as to define an incomplete circle in cross-section when brought together around the pipe to be connected, such that the first and second parts have opposing faces which are spaced apart from one another in use.

In exemplary embodiments, the connector assembly further includes a mechanical fastening arrangement for securing the first part relative to the second part about the circumference of a pipe to be connected.

In exemplary embodiments, the fastening arrangement comprises an array of bores in each of said first and second parts arranged and configured to be aligned so as to receive an elongate fastener for securing the first and second parts of the connector body relative to one another.

In exemplary embodiments, the first and second parts each define a radial end face, wherein the radial end face of the first part is arranged to oppose the radial end face of the second part in use; wherein the first and second parts each define an external surface of complementary arcuate profile; and wherein the bores have first and second ends, wherein the first end is open at the radial end face, and wherein the second end is open at the external surface, such that, when a bore in the first part is aligned with a bore in the second part, and an elongate fastener can extend between the first and second parts.

In exemplary embodiments, the connector assembly is configured such that the annular loading ring provides a closure for an open end of the connector body in use.

In exemplary embodiments, the annular seal element comprises a loading surface, an intermediate portion, and a contact portion, wherein the loading surface is arranged for receiving external load via the annular loading ring in use, for transmitting load to the contact portion via the intermediate portion, whereby the contact portion provides said first sealing contact and said second sealing contact; optionally, wherein the contact portion has a cross section which projects radially outwardly and radially inwardly for creating said first sealing contact and said second sealing contact, respectively; optionally, wherein the contact portion is part circular in cross-section.

In exemplary embodiments, the intermediate portion defines a radially inner surface which defines a concave profile.

A second aspect of the invention provides a method of connecting a pipe to a connector assembly, the method comprising the steps of:
locating an annular loading ring about a pipe to be connected;
locating a metal annular seal element of a mechanical seal arrangement about the pipe;
locating the annular loading ring and annular seal element within a connector body for housing the pipe, the connector body having a metal annular seal surface of the mechanical seal arrangement within, the annular seal surface for arrangement about the pipe and arranged for sealing contact with the annular seal element, wherein the annular loading ring is arranged for communication between the connector body and the pipe;
wherein the annular loading ring comprises one or more channels or bores extending from an external surface of the annular loading ring to an internal surface of the annular loading ring, for use in the application of energising load to the annular seal element within the connector body;
wherein the annular seal element is configured for creating a first annular sealing contact for creating a metal-to-metal seal with a metal outer surface of the pipe and a second annular sealing contact for creating a metal-to-metal seal with the annular seal surface under the application of an energising load via said one or more channels or bores;
wherein the annular loading ring is configured to be coupled with the connector body, to prevent relative axial movement between the annular loading ring and the connector body; and
wherein the connector assembly includes a mechanical engagement arrangement for preventing or limiting axial movement of the connector body relative to the pipe.

BRIEF DESCRIPTION OF THE DRAWINGS

Other aspects and exemplary features of the invention will be apparent from the following description of an exemplary embodiment, made by way of example only, with reference to the accompanying drawings, in which.

DETAILED DESCRIPTION

Figure 1:
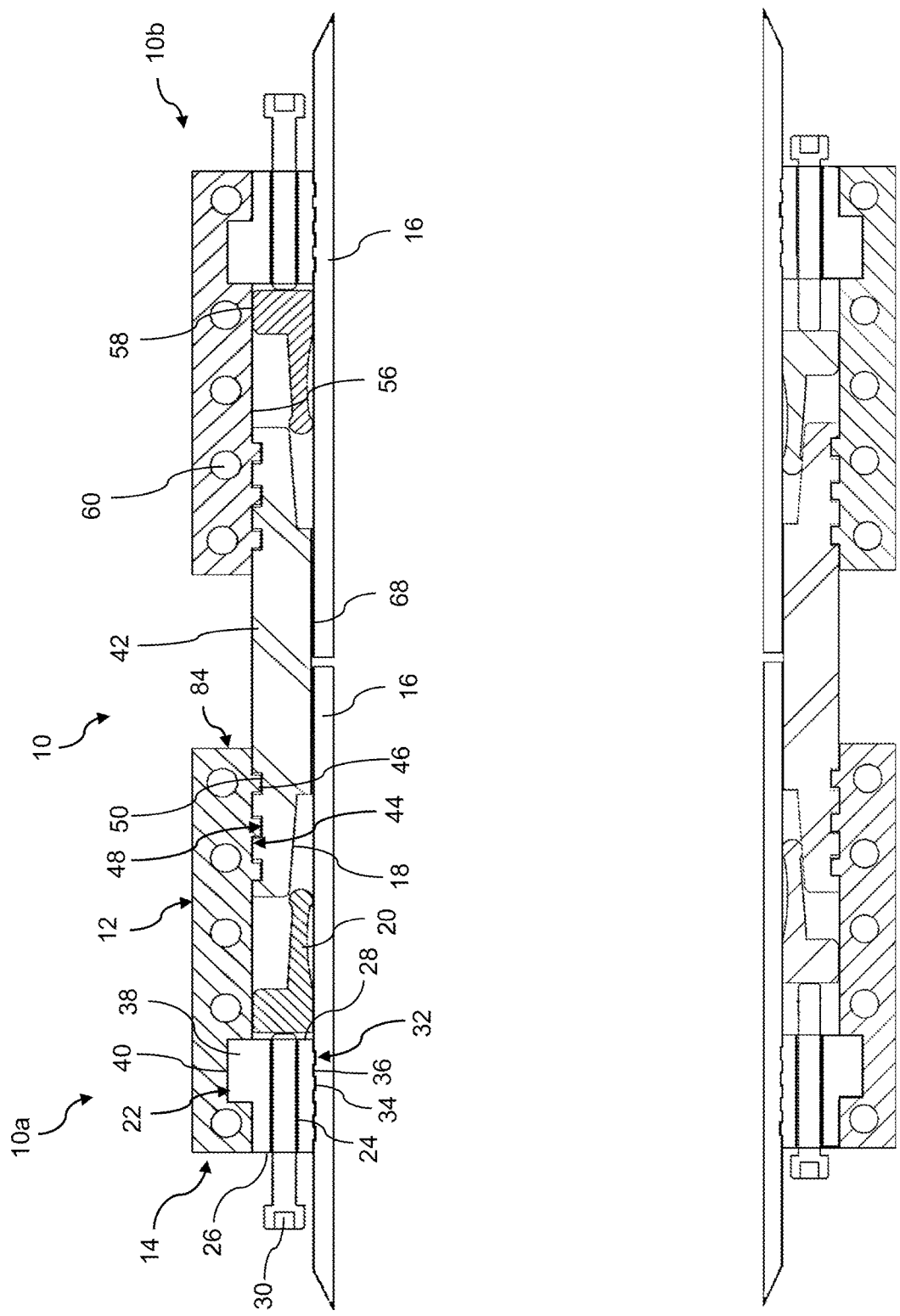
FIG. 1 is a cross-sectional view of a connector having opposing connector assemblies for connecting two pipes in fluid communication.

Referring to the FIG. 1, a connector for a pipe is indicated generally at 10. In this embodiment, the connector 10 is configured for connecting two pipes in sealed fluid communication with one another. As such, the connector 10 includes two interconnected assemblies (i.e. a first connector assembly 10a at the left hand end of the connector 10 of FIG. 1, and a second connector assembly 10b at the right hand of FIG. 1). Connector assemblies 10a and 10b are of identical of identical configuration and so only one will be described herein. Individual components of the connector assemblies 10a, 10b are shown in FIGS. 2 to 6, and will be understood from the following description of FIG. 1.

Connector assembly 10a has a connector body 12 for housing the free end of a pipe to be connected (shown at 16). The connector body 12 has a first end 14 and a second end 84.

The connector assembly 10a provides a mechanical seal arrangement within the connector body 12. More particularly, the mechanical seal arrangement has an annular seal surface 18 configured for arrangement about the pipe 16, and an annular seal element 20 configured for fitting about the pipe 16. The annular seal element 20 is configured for creating a first annular sealing contact with the pipe 16 and a second annular sealing contact with the annular seal surface 18. As such, a single seal element can be used to prevent fluid leakage between the pipe 16 and the connector assembly 10a.

The connector assembly further includes an annular loading ring 22 configured for fitting about the pipe 16. As can be seen from FIGS. 3, 4 and 6, the annular loading ring 22 is formed from a plurality of parts (e.g. two halves), intended to be brought together to surround the circumference of the pipe to be connected.

The annular loading ring 22 is configured to be arranged between the connector body 12 and the pipe 16 in use, that is to say, the annular loading ring 22 is configured to be arranged for communication between the connector body 12 and the pipe 16 in use.

As discussed more below, the annular loading ring 22 is in communication with the connector body 12 via a coupling which prevents relative movement between the annular loading ring 22 and the connector body 12. Further, the annular loading ring 22 is in communication with the pipe 16 via an arrangement which prevents relative movement between the annular loading ring 22 and the pipe 16.

The annular loading ring 22 is provided with a plurality of channels or bores 24 extending from an external surface 26 of the annular loading ring 22 to an internal surface 28 of the annular loading ring 22, for use in the application of energising load to the annular seal element 20 within the connector body 12, as will be described in more detail below.

It will be understood that one half of the illustration in FIG. 1 shows the connector assemblies 10a, 10b in a non-energised state (e.g. wherein no load has been applied to the annular seal element 20), whereas the other half shows the connector assemblies 10a, 10b in an energised state (e.g. wherein load has been applied to the annular seal element 20, in order to bring about first annular sealing contact with the pipe 16 and a second annular sealing contact with the annular seal surface 18), The plurality of channels or bores 24 are provided in a spaced array extending from an external surface 26 of the annular loading ring 22 to an internal surface 28 of the annular loading ring 22, for use in the application of energising load to the annular seal element 20 within the connector body 12, as will be described in more detail below. Multiple channels or bores 24, in a spaced array, and more advantageously in an array which provides at least one load point within each quarter of the annulus defined by the loading ring, allows for uniform application of energising load to the annular seal element 20, thereby providing beneficial sealing performance.

In the illustrated embodiment, each channel or bore 24 extends in an axial direction of the annular loading ring 22 and/or the connector body 12, so load can be transmitted to the annular seal element 20 in an axial direction of the connector body 12. This allows the configuration of the connector assembly 10a to be compact and robust.

The channels or bores 24 are provided in a uniformly spaced array, so that load can be applied to the annular seal element 20 at a plurality of points in a uniform manner. Although the embodiment of FIG. 1 includes a plurality of channels or bores 24 (twenty eight, to be specific), it may be possible to apply a suitable energising load to the annular seal element 20 using only a single channel or bore 24 (or using less or more channels or bores 24 than are shown in the illustrated embodiment), e.g. depending on the nature of the seal to be achieved (such as whether the connector assembly is to be used in a high or low pressure environment).

In exemplary embodiments, each channel or bore 24 has an internal thread such that a bolt 30 (or other elongate element, such as a rod) having a complementary external thread can be rotated therein, to advance into the connector body 12 and provide an energising load to said annular seal element 20, i.e. in an advantageously simple and controlled manner. In exemplary embodiments, other arrangements for the controlled application and retention of load via the channels or bores 24 can be used to replace the use of threaded interaction between the channels or bores 24 and the bolts 30.

In exemplary embodiments, the annular seal element 20 is metallic (e.g. is formed from metal) and the annular seal surface 18 is metallic (e.g. is formed from metal), for creating a metal-to-metal seal at said second annular sealing contact. In exemplary embodiments, the connector assembly 10a is used with metallic pipes (e.g. metal pipes), or pipes having a metallic outer surface (e.g. pipes having an outer surface formed from metal), for creating a metal-to-metal seal at said first annular sealing contact. Such embodiments will be particularly suited for use in high pressure and high temperature environments, such as in oil & gas applications and chemical processing environments etc. However, the connector assembly 10a and or the first and second sealing contacts may be produced from non-metallic materials, dependent on the intended use of the connector assembly 10a, e.g. using plastics materials.

In exemplary embodiments, the annular seal element 20 has a body formed from a metal material. For example, the body of the annular seal element 20 may be formed from a stainless steel such as a 303, 304 or 316 stainless steel. Forming the annular seal element 20 from a metal material allows the annular seal element 20 to withstand extreme pressures and temperatures, for example, in oil and gas applications.

As can be seen from FIG. 1, the annular loading ring 22 has a radially internal surface 32 configured to be adjacent the outer surface of the pipe 16 in use, e.g. in a close-fitting arrangement (i.e. with minimal spacing between the radially internal surface 32 and the outer surface of the pipe 16), or an interference fit. This allows for a compact and robust connector assembly, which can allow the connector assembly 10a to function at a high pressure rating.

As will be apparent from the description below, the connector assembly 10a has a mechanical engagement arrangement for preventing or limiting axial movement of the connector body 12 relative to the free end the pipe 16, in use. This provides for secure sealing contact between the annular seal element 20 and the pipe 16 and annular seal surface 18.

In the illustrated embodiment, the radially internal surface 32 has a profile configured for preventing relative movement between the annular loading ring 22 and the pipe 16. More particularly, the radially internal surface 32 defines one or more projections 34 for engagement with complementary formations 36 in the external surface of the pipe 16, for preventing relative movement between the annular loading ring 22 and the pipe 16. Typically, the complementary formations 36 in the external surface of the pipe 16 will be retro-formed into the pipe 16. This allows for a relatively simple configuration and assembly method. In other embodiments, the internal surface may be provided with alternative formations intended for interference or interdigitation with the outer surface of the pipe 16, e.g. barbed formations or the like.

In the illustrated embodiment, the annular loading ring 22 is configured to be coupled with the connector body 12, to prevent relative movement between the annular loading ring 22 and the connector body 12. This provides for a robust connector assembly 10a. More particularly, the annular loading ring 22 and connector body 12 have complementary formations configured to key the annular loading ring 22 to the connector body 12. In the illustrated embodiment, the annular loading ring 22 defines a projection 38 and the connector body 12 defines a complementary recess 40 for receiving said projection 38 of the annular loading ring 22, for keying the annular loading ring 22 to the connector body 12. In the illustrated embodiment, said projection 38 of the annular loading ring 22 extends in a radially outward direction. This provides for a robust configuration particularly suited to withstanding axial loads in use.

In the illustrated embodiment, the connector assembly 10a further includes an annular sleeve member 42 configured to extend within the connector body 12 and encircle the pipe 16. The annular seal surface 18 is provided on the sleeve member 42, and is configured to extend at an angle to the longitudinal axis of the connector body 12 in use. This allows for the annular seal surface 18 to be provided from different material to the connector body 12. It also enables the sealing concept to be adaptable to different types of application, e.g. wherein the sleeve member 42 can extend between to connector assemblies 10a, 10b, or can extend into a socket, such as in a valve or other terminal for receiving the free end of a pipe (and wherein the terminal can be modified to play the part of the connector housing 12).

In exemplary embodiments, the annular sleeve member 42 has a body formed from a metal material. As such, the annular seal surface 18 is a metal surface.

In the illustrated embodiment, the sleeve member 42 is elongate and extends continuously between the first and second connector assemblies 10a, 10b, in order to couple the connector assemblies 10a, 10b together, such that two pipes can be sealing connected in fluid communication with one another. In other embodiments, however, the sleeve member 42 may terminate at a distance axially distal the first open end 14 of the connector body 12 (e.g. to the right as viewed in FIG. 1), and suitably beyond the areas of first and second annular sealing contact of the annular seal element 20, such that the points of sealing contact are suitably supported by the connector assembly 10a. Such embodiments will be suitable for sealing a single pipe, e.g. to provide a sealed end cap for the pipe. Alternatively, the sleeve member 42 and connector body 12 housing may form part of a separate housing (e.g. a valve) into which the pipe 16 is intended to be connected in sealed fluid communication.

In the illustrated embodiment, the sleeve member 42 is configured to be coupled with the connector body 12, to prevent relative movement between the sleeve member 42 and the connector body 12 in use. This reduces the risk of loss of sealing capacity, in use.

In the illustrated embodiment, the sleeve member 42 and connector body 12 have complementary formations configured for keying the sleeve member 42 to the connector body 12. In the illustrated embodiment, the connector body 12 has an internal surface 44 having one or more projections 46, and the sleeve member 42 has an external surface 48 having a corresponding number of complementary recesses 50 for receiving the or each projection 46 of the connector body 12, for keying the sleeve member 42 to the connector body 12. In the illustrated embodiment, said more or more projections 46 of the connector body 12 extend in a radially inward direction. Again, this allows for a robust configuration creating axially facing abutment surfaces, which are particularly suited for withstanding axial loads in use. In exemplary embodiments, the projections 46 are provided on the sleeve 42 and the recesses 50 are provided in the connector body 12.

In the illustrated embodiment, the internal surface 44 of the connector body 12 extends in an axial direction of the connector body 12 in use. Moreover, the external surface 48 of the sleeve member 42 extends in an axial direction of the connector body 12 in use. In the illustrated embodiment, the external surface 48 of the sleeve member 42 nests within or is arranged in close proximity to the internal surface 44 of the connector body 12, in use, so as to provide structural support around the areas of first and second annular sealing contact of the annular seal element 20. This allows for a robust and compact connector assembly 10a.

In the illustrated embodiment, the connector body 12 is produced from first and second parts 52, 54 configured to be secured together and surround the annular seal surface 18 and the annular seal element 20 in use. This multi-part configuration allows for simple production and assembly of an annular-acting configuration of connector body 12.

Figure 4:
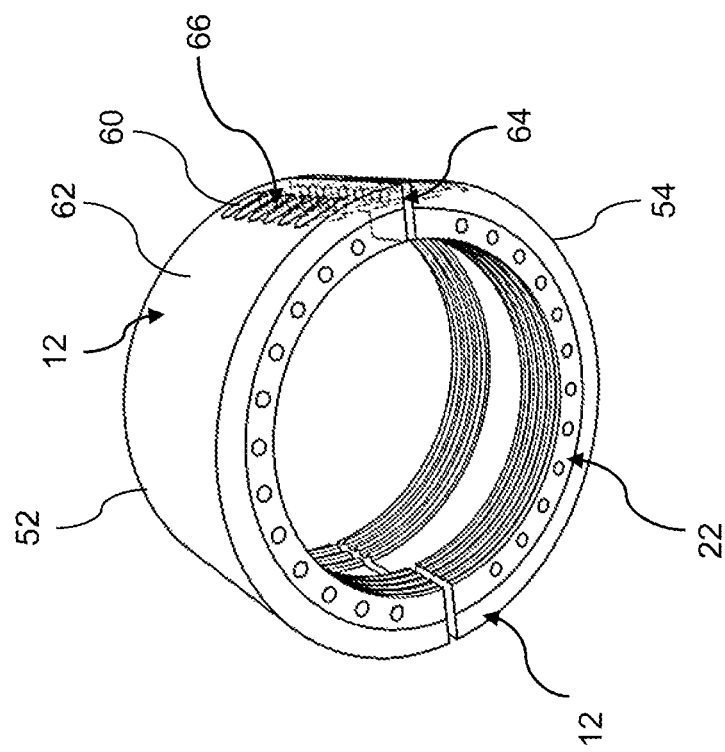
FIG. 4 is a perspective view of a connector housing for use in FIG. 1.
Figure 3:
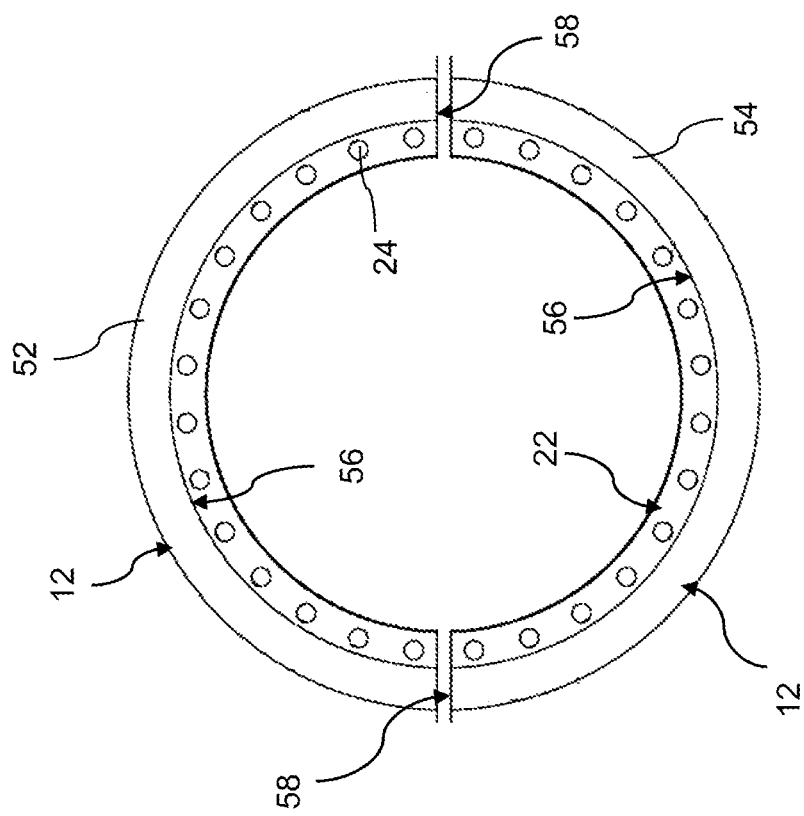
FIG. 3 is an axial end view of a connector assembly of FIG. 1.
Figure 6:
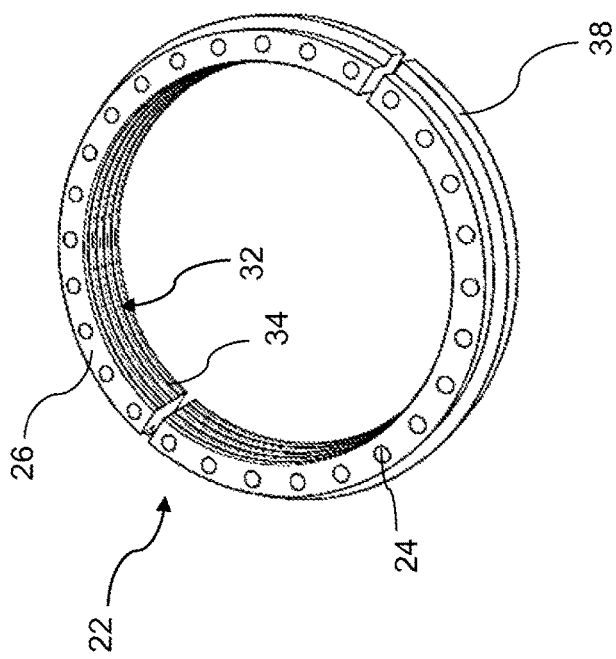
FIG. 6 is a perspective view of the annular loading ring for use in FIG. 1.
Figure 5:
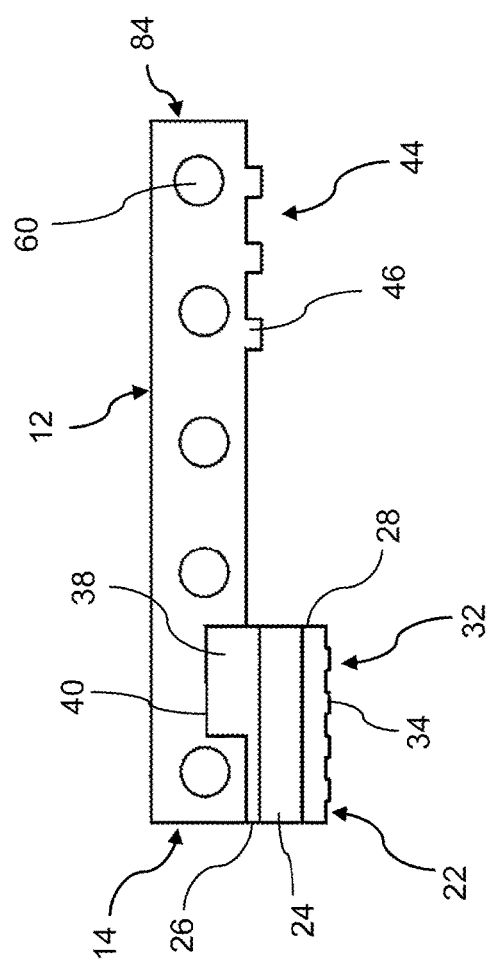
FIG. 5 is a cross-sectional view of the connector body and annular loading ring of FIG. 1.

As shown in FIGS. 1, 3, and 4, the first and second parts 52, 54 of the connector body 12 are configured to be secured together and surround the annular loading ring 22 in use. It will be understood that the connector body 12 also surrounds the pipe and annular seal element in use.

Said first and second parts 52, 54 have an inner wall 56 which defines an arcuate internal profile, and wherein the annular seal element 20 has a radially outer wall 58 of complementary arcuate external profile, for nesting within the arcuate internal profile of the said first and second parts 52, 54.

Figure 2:
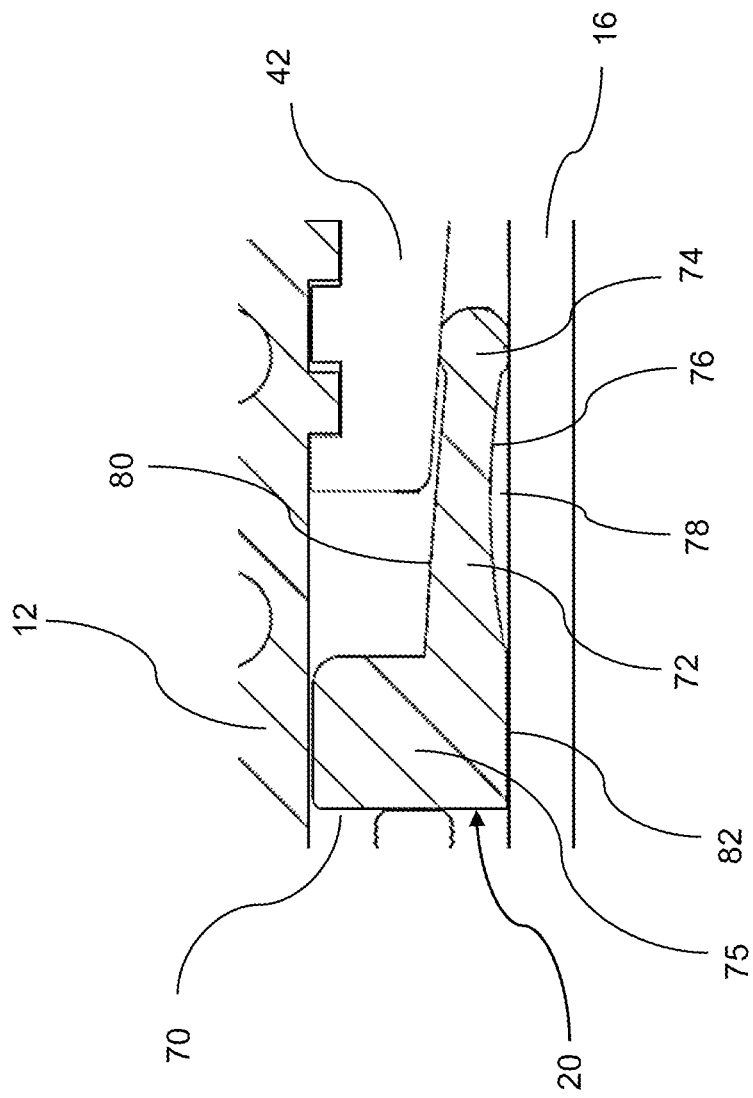
FIG. 2 is an enlarged view of the first and second seal contacts provided in the embodiment of FIG. 1.

As shown in FIGS. 1 and 2, the radially outer wall 58 of the annular seal element 20 is configured to be adjacent the inner wall 56 of the said first and second parts 52, 54 in use.

In exemplary embodiments, the first and second parts 52, 54 define a semi-circular internal profile, so as to come together to define a full circle in cross-section. However, in the illustrated embodiments, the first and second parts 52, 54 define a substantially semi-circular internal profile (e.g. having an internal angle which is less than 180 degrees but greater than 150 degrees; optionally, less than 178 degrees and greater than 165 degrees), so as to define an incomplete (yet substantially full) circle in cross-section when brought together around the pipe 16. Accordingly, the first and second parts 52, 54 have opposing faces 58 which are spaced apart from one another in use. It will be understood that the housing could also be provided by three or more parts of arcuate internal profile, configured to define a full or substantially full circle in cross-section. A similar concept can be adopted for the annular loading ring 22, so as to use two halves or multiple smaller arcuate parts intended to define a full circle or an incomplete (yet substantially full) circle in cross-section when brought together around the pipe 16.

The connector assembly 10a further includes a mechanical fastening arrangement for securing the first part 52 relative to the second part 54 about the circumference of a pipe to be connected. In the illustrated embodiment, the fastening arrangement takes the form of an array of bores 60 in each of said first and second parts 52, 54, which are arranged and configured to be aligned, so as to receive an elongate fastener (not shown) for securing the first and second parts 52, 54 of the connector body 12 relative to one another.

As can be seen, the first and second parts each define a radial end face 58, wherein the radial end face 58 of the first part 52 is arranged to oppose the radial end face 58 of the second part 54 in use (which may be in abutment in the 'semi-circular' embodiments mentioned above).

In the illustrated embodiment, the first and second parts 52, 54 each define an external surface 62 of complementary arcuate profile (so as to define a continuous arc of circumference). The bores 60 have first and second ends 64, 66, wherein the first end 54 is open at the radial end face 58, and wherein the second end 66 is open at the external surface 62, such that, when a bore 60 in the first part 54 is aligned with a bore 60 in the second part 56, and an elongate fastener (not shown) can extend between the first and second parts 52, 54. A suitable fastener may take the form of a rod or bolt having a thread for communication with a thread formed in said bores 60 and/or a thread provided on a nut to be tightened onto the opposing ends of the rod or bolt, for example.

It can be seen that the connector assembly 10a is configured such that the annular loading ring 20 provides a closure for the first end of the connector body 12 in use; that is to say, when the plurality of parts of the annular loading ring 20 are brought together to surround the circumference of the pipe 16, the annular loading ring 20 provides a closure for the first end of the connector body 12. It will be appreciated that the sleeve member 42 may also be configured to define a closure for a second end 84 of the connector body 12 in use.

The sleeve member 42 has a radially internal surface 68 configured to be adjacent the outer surface of the pipe 16 in use, e.g. in a close-fitting arrangement (i.e. with minimal spacing between the radially internal surface 68 and the outer surface of the pipe 16), or an interference fit. This provides for a robust and compact assembly 10a.

The annular seal element 20 has a base portion 75 including a loading surface 70, an intermediate portion 72, and a contact portion 74. The loading surface 70 is arranged for receiving external load via the annular loading ring 22 in use, for transmitting load to the contact portion 74 via the intermediate portion 72, whereby the contact portion 74 can be brought into said first sealing contact and said second sealing contact.

The contact portion 74 has a cross section which projects radially outwardly and radially inwardly with respect to the intermediate portion, for creating said first sealing contact and said second sealing contact, respectively. In the illustrated embodiment, the contact portion 74 is part circular in cross-section for creating said first sealing contact and said second sealing contact. However, other cross-sections are envisaged, which can provided radially outwardly and radially inwardly areas for creating said first sealing contact and said second sealing contact, respectively, e.g. a diamond or other polygonal profile with vertices projecting radially outwardly in opposing directions.

In the illustrated embodiment, the intermediate portion 72 defines a radially inner surface 76, which defines a concave profile (e.g. to define a concavity 78 adjacent the pipe 16 in use).

As illustrated in FIGS. 1 and 2, the concave profile of the radially inner surface 76 extends from the base portion 75 to the contact portion 74.

The intermediate portion 72 also defines a radially outer surface 80 which defines a planar surface angled relative to a longitudinal axis of the connector body 12 in use, extending from a first diameter proximal the contact portion 74 to a second diameter distal the contact portion 74, wherein the first diameter is smaller than the second diameter (such that the intermediate portion defines a substantially tapered profile in cross-section). This configuration of annular seal element has been found to be particularly advantageous, e.g. as described in WO2015/036757. In particular, concave profile of the intermediate portion 72 has been found to provide a degree of resilience, which assists in assuring sealing contact between the contact portion 74 and the pipe 16 and annular seal surface 18 in use. This is especially important in embodiments in which the annular seal element 20 is otherwise a relatively rigid, solid component (e.g. a metal sealing ring).

In the illustrated embodiment, the base portion 75 of the annular seal element 20 has a radially internal surface 82 configured to be adjacent the outer surface of the pipe 16 in use, e.g. in a close-fitting arrangement (i.e. with minimal spacing between the radially internal surface 82 and the outer surface of the pipe 16), or an interference fit.

As illustrated in FIGS. 1 and 2, the base portion 75 of the annular seal element 20 is partially defined by the radially internal surface 82, the radially outer wall 58 and the loading surface 70. The intermediate portion 72 extends axially away from the base portion 75.

In use, radial movement of the annular seal element 20 is restricted in the radially outward direction by abutment between the inner wall 56 of the connector body 12 and the radially outer wall 58 of the base portion 75, and in the radially inward direction by abutment between the outer surface of the pipe 16 and the radially internal surface 82 of the base portion 75. This helps to provide a robust and rigid fitting of the annular seal element 20 over the pipe 16. The annular seal element 20 is configured such that there is a limited degree of radial play between the annular seal element 20, the connector body 12 and the pipe 16 to allow the annular seal element 20 to be received within the connector body 12 and over the free end of the pipe 16 during assembly.

In the illustrated embodiment, the intermediate portion 72 is narrower than the base portion 75; i.e. the maximum thickness of the intermediate portion 72 along the radial direction is smaller than the minimum thickness of the base portion 75 in the radial direction.

In the illustrated embodiment, the radially internal surface 82 of the annular seal element 20 is the radial innermost surface of the annular seal element 20 when the connector assembly 10a is the non-energised state; i.e. wherein no load has been applied to the annular seal element 20, the intermediate portion 72 and the contact portion 74 are located radially outward of the radially internal surface 82. As such, the contact portion 74 does not contact the outer surface of the pipe 16 when the connector assembly 10a is the non-energised state.

In exemplary embodiments, the annular seal element 20 is a substantially rigid solid metal body. As such, the contact portion 72 is rigidly supported by the intermediate portion 74 when the connector assembly 10a is the non-energised state. When a sufficiently high external load is applied to the loading surface 70, the intermediate portion 72 is configured to flex as the contact portion 74 is brought into said first sealing contact and said second sealing contact in the energised state of the connector assembly 10a (as shown in the lower half of FIG. 1).

An exemplary method of connecting a pipe 16 to the connector assembly 10a would follow the steps of:

locating the annular loading ring 22 about the pipe to be connected (e.g. by bringing together the parts of the ring 22 about the pipe 16);

locating the annular seal element 20 about the pipe (e.g. by passing the element 20 over the free end of the pipe 16);

locating the annular loading ring 22 and annular seal element 20 within the connector body 12, with the annular seal surface 18 arranged for sealing contact with the annular seal element 20, and with the annular loading ring 22 arranged between the connector body 12 and the pipe 16.

Load can then be applied to the seal element 20 via the one or more channels or bores for energising the annular seal element within the connector body, in order to create a first annular sealing contact with the pipe and a second annular sealing contact with the annular seal surface.

Connector assemblies 10a, 10b of the kind set forth above have been found to provide substantial sealing capacity. Connector assemblies 10a, 10b of the kind set forth above are simple to manufacture, straight forward to assemble, and structurally robust. Connector assemblies 10a, 10b provide an advantageous alternative to flanged connections within pipelines, and have been found to provide high levels of working performance, especially in metal-to-metal applications, wherein the pipe and connector assembly is made of metallic materials, such as stainless steels.

The connector assemblies 10a, 10b are suitable for use with fluids (i.e. liquids or gases) such as crude oil, natural gas, hydrocarbons, water or chemical compositions, etc. In metal-to-metal configurations with a stainless steel annular sealing ring, the connector assemblies 10a, 10b are suitable for use are suitable for use at temperatures, e.g. from 250K to 400K.

It may be preferable to produce the annular loading ring and/or the annular sleeve from different materials than the connector body, since those parts of the connector assemblies 10a, 10b are likely to be under greater stress in use, dependent on the nature of the seal to be provided.

For special applications, such as high temperature and/or high pressure environments, the connector assembly is produced from high tensile stainless steels, such as austenitic stainless steels.

Typically, the annular seal element will be produced as a solid metal component from stainless steel. Of course, sealing effects might also be obtainable using other materials for the constituent parts of the connector assemblies in other applications, e.g. plastics material in lower pressure fluid lines.

In exemplary embodiments, the annular seal surface 18 is produced from the same material as the outer surface of the pipe to be connected.

The connector body can be incorporated as part of any type of connector that is configured to receive a pipe, such as a general pipe joint, a flexible connection, a valve, or a pipe reducer. The skilled person will appreciate any other appropriate applications of the connector assemblies described herein.

Although embodiments described herein include an annular seal surface provided on a sleeve extending within the connector body, the annular seal surface may be integral to the connector body in alternative embodiments.

The invention claimed is:

1. A connector assembly for connecting to a pipe, the connector assembly comprising:

a connector body for housing a length of the pipe to be connected;

a mechanical seal arrangement within the connector body, the mechanical seal arrangement comprising a metal annular seal surface configured for arrangement about the pipe to be connected, the mechanical seal arrangement further comprising a metal annular seal element configured for fitting about the pipe to be connected, wherein the annular seal element is configured for providing a first metal-to-metal annular sealing contact with a metal outer surface of a pipe to be connected and a second metal-to-metal annular sealing contact with the metal annular seal surface;

wherein the connector assembly further comprises an annular loading ring configured for fitting about the pipe to be connected; and wherein the annular loading ring comprises one or more channels or bores extending from an external surface of the annular loading ring to an internal surface of the annular loading ring, for an application of energising load to the annular seal element within the connector body;

further wherein the connector assembly includes a mechanical engagement arrangement for preventing axial movement of the connector body relative to the pipe to be connected, and wherein the annular loading ring is configured to be coupled with the connector body, for preventing relative axial movement between the annular loading ring and the connector body, wherein the annular loading ring is configured to be within the connector body and arranged for communication between the connector body and the pipe to be connected.

2. The connector assembly according to claim 1, wherein the annular loading ring is formed from a plurality of parts intended to be brought together to surround the circumference of the pipe to be connected.

3. The connector assembly according to claim 2, wherein the annular loading ring has a radially internal surface configured to be adjacent the pipe to be connected, wherein the radially internal surface of the annular loading ring has a profile configured for preventing relative movement between the annular loading ring and the pipe; optionally, wherein the radially internal surface of the annular loading ring defines one or more projections for engagement with a complementary formation in the external surface of the pipe to be connected, for preventing relative movement between the annular loading ring and the pipe.

4. The connector assembly according to claim 1, wherein each channel or bore of said annular loading ring is configured such that an elongate member can be controllably advanced into the connector body for providing an energising load to said annular seal element; optionally, wherein the elongate member is a bolt or rod, wherein each channel or bore comprises an internal thread such that the bolt or rod with a complementary external thread can be rotated therein, to advance the bolt or rod into the connector body and provide the energising load to said annular seal element; optionally, wherein each channel or bore extends in an axial direction of the annular loading ring and/or the connector body.

5. The connector assembly according to claim 4, wherein the elongate member is a bolt or rod.

6. The connector assembly according to claim 1, wherein the connector assembly is configured so that the annular loading ring provides a closure for an open end of the connector body when the annular loading ring is mounted about the circumference of the pipe to be connected.

7. The connector assembly according to claim 1, wherein the connector body comprises a plurality of parts configured to be secured together to at least substantially surround the annular loading ring.

8. The connector assembly according to claim 7, wherein the annular loading ring and the connector body comprise complementary formations configured to key the annular loading ring to the connector body to prevent relative axial movement between the annular loading ring and the connector body; optionally, wherein the annular loading ring defines a projection and the connector body defines a complementary recess for receiving said projection of the annular loading ring and for keying the annular loading ring to the connector body; optionally, wherein said projection of the annular loading ring extends in a radially outward direction.

9. The connector assembly according to claim 7, wherein said plurality of parts of the connector body are configured to be secured together to at least substantially surround the annular seal element.

10. The connector assembly of claim 9, wherein said plurality of parts of the connector body comprises first and second parts each defining a semi-circular internal profile, or wherein said plurality of parts of the connector body comprises first and second parts each defining a substantially semi-circular internal profile, so as to define an incomplete circle in cross-section when brought together around the pipe to be connected, such that the first and second parts each have opposing faces which are spaced apart from one another.

11. The connector assembly of claim 10, wherein the substantially semi-circular internal profile has an internal angle which is less than 180 degrees but greater than 150 degrees.

12. The connector assembly of claim 11, wherein the substantially semi-circular internal profile has the internal angle which is less than 178 degrees and greater than 165 degrees.

13. The connector assembly according to claim 1, wherein the connector body comprises a plurality of parts, said plurality of parts comprising first and second parts, and wherein the connector assembly further includes a mechanical fastening arrangement for securing the first part relative to the second part about the circumference of the pipe to be connected.

14. The connector assembly according to claim 13, wherein the fastening arrangement comprises an array of bores in each of said first and second parts arranged and configured to be aligned so as to receive an elongate fastener for securing the first and second parts of the connector body relative to one another; optionally, wherein the first and second parts each define a radial end face, wherein the radial end face of the first part is arranged to oppose the radial end face of the second part; wherein the first and second parts each define an external surface of complementary arcuate profile; and wherein the bores have first and second ends, wherein the first end is open at the radial end face, and wherein the second end is open at the external surface, such that, when a bore in the first part is aligned with a bore in the second part, an elongate fastener can extend between the first and second parts.

15. The connector assembly according to claim 1, wherein the annular seal element comprises a base portion, an intermediate portion, and a contact portion, the base portion comprising a loading surface, wherein the loading surface is arranged for receiving external load via at least one elongate member received in one of the one or more channels or bores of the annular loading ring, for transmitting load to the contact portion via the intermediate portion, whereby the contact portion provides said first metal-to-metal annular sealing contact and said second metal-to-metal annular sealing contact; optionally, wherein the loading surface is a surface extending transverse to a longitudinal axis of the annular seal element.

16. The connector assembly according to claim 15, wherein the annular seal element is a solid metal body, and wherein the intermediate portion is configured to flex when a sufficiently high load is applied to the loading surface to bring the contact portion into said first sealing contact and said second sealing contact; optionally, wherein the intermediate portion defines a radially inner surface which defines a concave profile; optionally, wherein said concave profile extends from the base portion to the contact portion.

17. The connector assembly according to claim 15, wherein the base portion comprises a radially outer surface configured to be adjacent an inner surface of the connector body, and a radially inner surface configured to be adjacent an outer surface of the pipe to be connected.

18. The connector assembly according to claim 1, wherein the connector assembly is configured for housing the annular seal element between the connector body and the pipe to be connected; optionally, wherein the annular seal element defines a ring having a radially innermost surface and a radially outermost surface, wherein the radially innermost surface is arranged adjacent the outer surface of the pipe and the radially outermost surface is arranged adjacent an inner surface of the connector body.

19. The connector assembly according to claim 18, wherein the connector body comprises a plurality of parts configured to be secured together to at least substantially surround annular seal element; optionally, wherein said plurality of parts of the connector body comprises first and second parts each defining a semi-circular internal profile, or wherein said plurality of parts of the connector body comprises first and second parts each defining a substantially semi-circular internal profile, so as to define an incomplete circle in cross-section when brought together around the pipe to be connected, such that the first and second parts each have opposing faces which are spaced apart from one another.

20. The connector assembly of claim 19, wherein the substantially semi-circular internal profile has an internal angle which is less than 180 degrees but greater than 150 degrees.

21. The connector assembly of claim 20, wherein the substantially semi-circular internal profile has the internal angle which is less than 178 degrees and greater than 165 degrees.

22. The connector assembly according to claim 1, wherein the annular seal surface is configured to extend at an angle to the longitudinal axis of the connector body.

23. The connector assembly according to claim 1, wherein the annular seal surface is provided on a sleeve member configured to extend within the connector body and surround the pipe to be connected; optionally, wherein the sleeve has a radially inner surface configured to be arranged adjacent the outer surface of the pipe; optionally, wherein the sleeve is configured to extend into a further connector body, for joining the pipe and a second pipe in sealed fluid communication.

24. The connector assembly according to claim 23, wherein the sleeve member is configured to be coupled with the connector body, to prevent relative movement between the sleeve member and the connector body; optionally, wherein the sleeve member and connector body comprise complementary formations configured to key the sleeve member to the connector body; optionally, wherein the connector body comprises an internal surface having one or more projections, and wherein the sleeve member comprises an external surface having a corresponding number of complementary recesses for receiving said at least one projection of the connector body, for keying the sleeve member to the connector body; optionally, wherein said more or more projections of the connector body extends in a radially inward direction; optionally, wherein said internal surface of the connector body extends in an axial direction of the connector body; optionally, wherein said external surface of the sleeve member extends in an axial direction of the connector body.

25. A connector assembly for connecting to a pipe, the connector assembly comprising:
- a connector body for housing a length of the pipe to be connected;
- a mechanical seal arrangement within the connector body, the mechanical seal arrangement comprising a metal annular seal surface configured for arrangement about the pipe to be connected, the mechanical seal arrangement further comprising a metal annular seal element configured for fitting about the pipe to be connected, wherein the annular seal element is configured for providing a first metal-to-metal annular sealing contact with a metal outer surface of a pipe to be connected and a second metal-to-metal annular sealing contact with the metal annular seal surface,
- wherein the connector assembly further comprises a mechanical engagement arrangement for preventing axial movement of the connector body relative to the pipe to be connected,
- wherein the connector assembly further comprises an annular loading ring configured for fitting about the pipe to be connected,
- wherein the annular loading ring is configured to be arranged for communication between the connector body and the pipe to be connected,
- wherein the annular loading ring comprises one or more channels or bores extending from an external surface of the annular loading ring to an internal surface of the annular loading ring, for an application of energising load to the annular seal element within the connector body,
- wherein the annular loading ring defines a projection, and the connector body defines a complementary recess for receiving said projection, for keying the annular loading ring to the connector body for preventing relative axial movement therebetween, and
- wherein said projection extends in a radially outward direction.

26. A method of connecting a pipe to a connector assembly, the method comprising the steps of:
- locating an annular loading ring about the pipe to be connected;
- locating a metal annular seal element of a mechanical seal arrangement about the pipe;
- locating the annular loading ring and annular seal element within a connector body for housing the pipe, the connector body having a metal annular seal surface of the mechanical seal arrangement within, the annular seal surface for arrangement about the pipe and arranged for sealing contact with the annular seal element, wherein the annular loading ring is arranged for communication between the connector body and the pipe;
- wherein the annular loading ring comprises one or more channels or bores extending from an external surface of the annular loading ring to an internal surface of the annular loading ring, for an application of energising load to the annular seal element within the connector body;
- wherein the annular seal element is configured for creating a first annular sealing contact for creating a metal-to-metal seal with a metal outer surface of the pipe and a second annular sealing contact for creating a metal-to-metal seal with the annular seal surface under the application of an energising load via said one or more channels or bores;
- wherein the annular loading ring is configured to be coupled with the connector body, to prevent relative axial movement between the annular loading ring and the connector body; and
- wherein the connector assembly includes a mechanical engagement arrangement for preventing or limiting axial movement of the connector body relative to the pipe.

* * * * *